(12) United States Patent
Zahn

(10) Patent No.: US 8,939,467 B2
(45) Date of Patent: Jan. 27, 2015

(54) VEHICLE STEERING WHEEL, GAS BAG MODULE FOR A VEHICLE STEERING WHEEL

(75) Inventor: Matthias Zahn, Stockstadt (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 14/131,376

(22) PCT Filed: Jul. 9, 2012

(86) PCT No.: PCT/EP2012/063388
§ 371 (c)(1),
(2), (4) Date: Jan. 16, 2014

(87) PCT Pub. No.: WO2013/004847
PCT Pub. Date: Jan. 10, 2013

(65) Prior Publication Data
US 2014/0131984 A1 May 15, 2014

(30) Foreign Application Priority Data
Jul. 7, 2011 (DE) .......................... 10 2011 078 835

(51) Int. Cl.
*B60R 21/203* (2006.01)
*B60R 21/215* (2011.01)
*B62D 1/04* (2006.01)

(52) U.S. Cl.
CPC ........... *B60R 21/203* (2013.01); *B60R 21/2035* (2013.01); *B60R 21/215* (2013.01); *B62D 1/04* (2013.01)
USPC ....................................... 280/731; 280/728.2

(58) Field of Classification Search
CPC ...... B60R 21/203; B60R 21/2035; B62D 1/04
USPC .............................................. 280/728.2, 731
See application file for complete search history.

(56) References Cited

U.S. PATENT DOCUMENTS 4,828,286 A 5/1989 Fohl
4,899,613 A * 2/1990 Kawaguchi ..................... 74/552
(Continued)

FOREIGN PATENT DOCUMENTS

DE 86 19 591 U1 8/1987
DE 36 30 685 A1 2/1988
(Continued)

OTHER PUBLICATIONS

International Search Report from the International Bureau of WIPO for International Application No. PCT/EP2012/063388 dated Nov. 2, 2012 (2 pages) and an English translation of the same (2 pages).

*Primary Examiner* — Ruth Ilan
(74) *Attorney, Agent, or Firm* — Fitch Even Tabin & Flannery, LLP

(57) ABSTRACT

The invention relates to a vehicle steering wheel with a steering wheel hub, a steering wheel rim and steering wheel spokes which connect the steering wheel rim with the steering wheel hub, wherein the steering wheel hub includes a steering wheel fastening region for fastening the vehicle steering wheel to a steering shaft of a vehicle, and wherein in the vehicle steering wheel a gas bag is mounted. It is provided that the gas bag is arranged in the vehicle steering wheel in radial direction exclusively outside the steering wheel hub and/or eccentrically to the steering wheel hub. It thus becomes possible that in the case of an attachment of the vehicle steering wheel to a steering shaft, the steering wheel fastening region is accessible in axial direction and is not covered by the mounted gas bag.

12 Claims, 5 Drawing Sheets

(56) References Cited

U.S. PATENT DOCUMENTS

| | | | |
|---|---|---|---|
| 5,152,358 A | | 10/1992 | Kozuka |
| 5,257,816 A | * | 11/1993 | Sugimoto et al. ............. 280/735 |
| 5,622,379 A | * | 4/1997 | Suzuki et al. ............. 280/728.2 |
| 5,853,190 A | * | 12/1998 | Rion et al. ............. 280/728.2 |
| 6,098,494 A | * | 8/2000 | Kellogg et al. ............. 74/552 |
| 2002/0084634 A1 | | 7/2002 | Adomeit et al. |
| 2005/0230943 A1 | * | 10/2005 | Thomas ............. 280/731 |
| 2009/0322064 A1 | * | 12/2009 | Piotrowski ............. 280/731 |
| 2010/0289253 A1 | | 11/2010 | Washino et al. |

FOREIGN PATENT DOCUMENTS

| | | |
|---|---|---|
| DE | 44 15 765 A1 | 11/1995 |
| DE | 44 31 718 A1 | 3/1996 |
| DE | 198 17 349 A1 | 10/1999 |
| DE | 199 11 682 A1 * | 9/2000 |
| DE | 200 80 100 U1 | 5/2002 |
| DE | 11 2009 000 163 T5 | 2/2011 |
| EP | 0 414 245 A1 | 2/1991 |
| EP | 0 703 121 A1 | 3/1996 |
| JP | 10-119700 A * | 5/1998 |

* cited by examiner

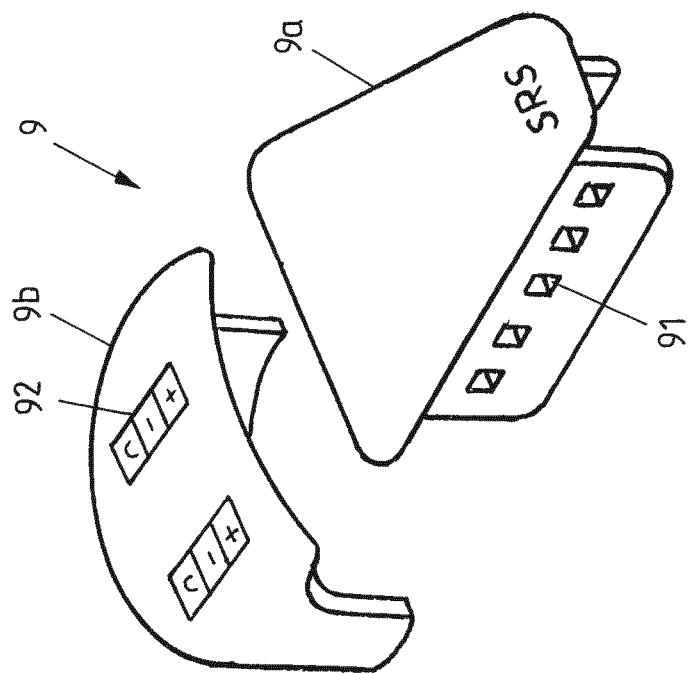
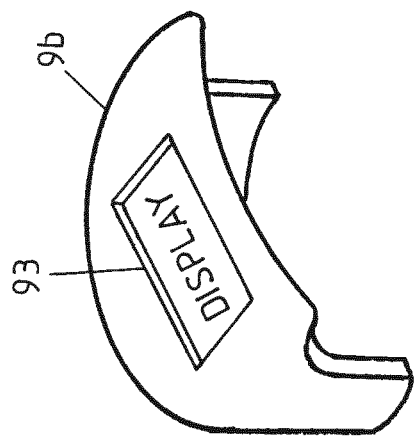
FIG 4A
FIG 4B

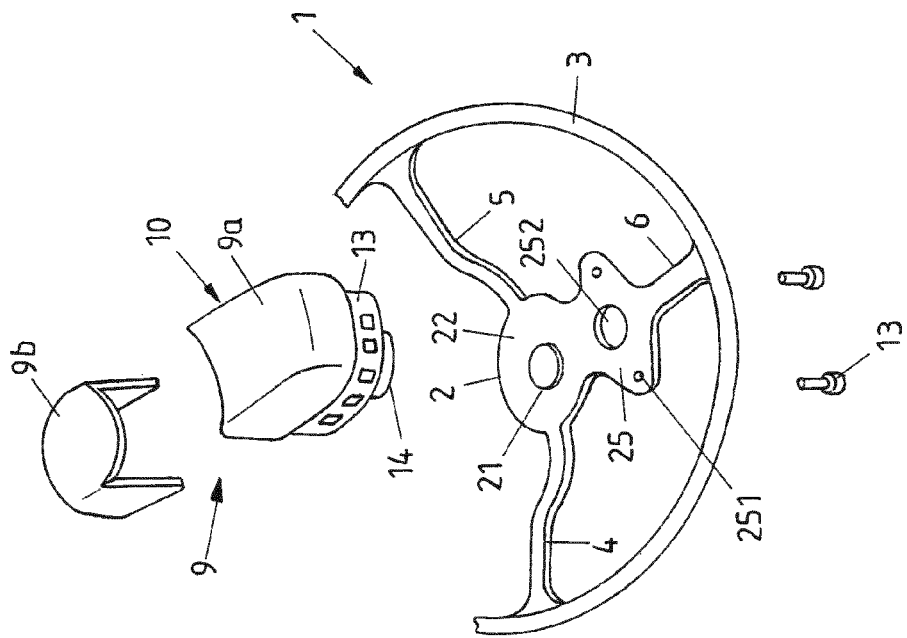
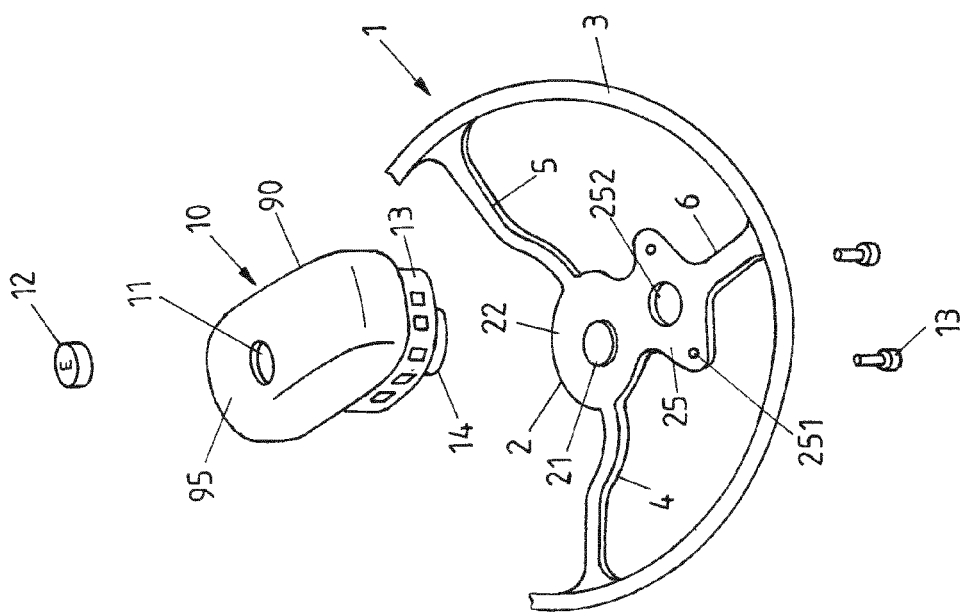

VEHICLE STEERING WHEEL, GAS BAG MODULE FOR A VEHICLE STEERING WHEEL

CROSS-REFERENCE TO RELATED APPLICATIONS

This application is a National Phase Patent Application of International Patent Application Number PCT/EP2012/063388, filed on Jul. 9, 2012, which claims priority of German Patent Application Number 10 2011 078 835.2, filed on Jul. 7, 2011, which are hereby incorporated herein by reference in their entirety.

BACKGROUND

This invention relates to a vehicle steering wheel and to a gas bag module for such vehicle steering wheel.

It is known to integrate a gas bag into a vehicle steering wheel, which is deployed during an impact of the vehicle and thereby protects the driver of the vehicle from injuries. For mounting a gas bag in a vehicle steering wheel it is usual to insert a gas bag module, which in addition to the gas bag comprises a gas generator and a housing, into the vehicle steering wheel. Such gas bag module is mounted centrally in the region of the steering wheel hub. Since the accessibility of the steering wheel attachment thereby is blocked, it is required to mount the steering wheel on a steering shaft of the vehicle, before the gas bag module is mounted.

From the generic documents DE 44 15 765 A1 and DE 198 17 349 A1 it is known to integrate a gas bag directly into the skeleton of a steering wheel. In these solutions it also is the case that the gas bag integrated into the vehicle steering wheel covers the steering wheel hub. To ensure that after arrangement of the gas bag in the steering wheel, the steering wheel can be connected with the steering shaft, constructively complex special solutions are required, which change the hub connection.

SUMMARY

It is an object underlying the present invention to provide a vehicle steering wheel which with already mounted gas bag is easily connectable with the steering shaft of a vehicle. Furthermore, there should be provided a gas bag module for such vehicle steering wheel.

According to a first aspect of an exemplary embodiment of the invention it is provided that the gas bag is arranged in the vehicle steering wheel in radial direction outside the steering wheel hub and/or eccentrically to the steering wheel hub. This leads to the fact that in the case of an attachment of the vehicle steering wheel to a steering shaft, the steering wheel fastening region is accessible in axial direction and is not covered by the mounted gas bag. It thus becomes possible to fasten the steering wheel with the steering shaft only after the arrangement of the gas bag in the steering wheel.

Due to the eccentric or radially outer arrangement of the gas bag, it is possible to have access to the steering wheel fastening region even after mounting said gas bag from above, i.e. in direction towards the steering shaft, and thus attach the vehicle steering wheel to the steering shaft without the necessity of a constructively complex change of the hub connection. An attachment of the vehicle steering wheel to the steering shaft rather can be effected such that the steering wheel hub is pushed onto the steering shaft and the same are fixed to each other from above in axial direction.

The gas bag completely and exclusively is arranged outside the steering wheel hub, so that not a single layer of the gas bag covers the steering wheel hub in axial direction.

In one exemplary aspect of the invention it is provided that the gas bag is part of a prefabricated gas bag module including a gas generator, which is mounted in the vehicle steering wheel. According to this exemplary embodiment the gas bag module is formed such that it can be arranged in the steering wheel outside the steering wheel hub, namely radially outside with respect to the steering wheel hub and/or eccentrically, so that the steering wheel fastening region remains accessible even after the assembly of the gas bag module.

In an alternative aspect of the invention it is provided that the gas bag is arranged directly in and/or at a component of the vehicle steering wheel, in particular of the steering wheel skeleton. According to this design variant, the steering wheel itself together with the gas bag or a gas generator likewise integrated into the steering wheel forms a gas bag module.

For this purpose, it can be provided that the steering wheel skeleton forms a receptacle for the gas bag, in which the gas bag is arranged. According to a design variant, the receptacle is formed eccentrically to the steering wheel hub. It can be provided that the receptacle is formed integrally with other elements of the steering wheel skeleton. Thus, the gas bag is directly integrated into the steering wheel skeleton. For example, the steering wheel skeleton includes a spoke region and the receptacle is formed in the spoke region, i.e. in the region of at least one spoke.

To achieve an eccentric arrangement of the gas bag in the steering wheel or an arrangement radially outside with respect to the steering wheel hub, a gas bag of a small packing size preferably is used. In principle, a small packing size of the gas bag can be achieved in a multitude of ways, for example by utilizing a very thin fabric. According to a preferred aspect of the invention it therefore is provided that the gas bag is packed under vacuum, by using a vacuum folding technology. By applying a vacuum to the gas bag interior, smaller packing sizes can be achieved during folding.

When the gas bag is integrated directly into the vehicle steering wheel, the gas generator also is attached directly to the steering wheel skeleton or integrated into the same. Thus, the gas generator for example is attached directly to a spoke of the vehicle steering wheel. It can also be provided that cavities of a metallic steering wheel skeleton form a gas generator, for which purpose for example a cavity formed in the steering wheel rim or in a steering wheel hub is filled with a gas or a pyrotechnical propellant charge.

In a further exemplary aspect of the invention it is provided that the steering wheel includes a covering cap facing the driver. Gas bag covers in the form of covering caps are mounted on the steering wheel of a vehicle such that a gas bag arranged in the steering wheel is covered towards the side of the vehicle interior space. To enable the gas bag to deploy into the vehicle interior space in the case of activation, the gas bag cap has a region which opens (for example tears open) due to the pressure of the deploying gas bag, so that the inflated gas bag can extend through the opening of the gas bag cap into the vehicle interior space.

According to one exemplary aspect of the invention it is provided that the covering cap is formed in two parts. A first part of the covering cap covers the gas bag and protects the same. A second part of the covering cap, which is mounted only after connecting the steering wheel with a steering shaft, covers the steering wheel hub. This provides for integrating functions into the covering cap, namely into the second part of the covering cap, which go beyond the function of an optically appealing finish towards the vehicle interior space. For example it can be provided that the second part of the covering cap includes control and/or display elements, which in vehicle steering wheels known in the prior art are realized at the steering wheel rim and/or the steering wheel spokes. In further exemplary embodiments it is provided that beside or instead of control and/or display functions, functions are integrated into the second part of the covering cap which in known motor vehicles are located outside the steering wheel. The same include for example the integration of a storage box and/or a hands-free microphone and/or a notepad and the like. The realization of such functions is possible, since the second part of the covering cap is not opened on activation of the gas bag.

Furthermore, it can be provided that merely the second part of the covering cap is movably mounted and is coupled with elements which realize a horn function. It can thereby be refrained from Movably mounting the gas bag or a gas bag module, which leads to a simplified construction. Alternatively, however, it can also be provided that the horn function is activated by the first part of the covering cap or both by the first part and by the second part of the covering cap.

A two-part formation of a covering cap is particularly advantageous when the first part of the covering cap is part of a gas bag module, while the second part of the covering cap is attached to the vehicle steering wheel after mounting the gas bag module in the vehicle steering wheel. The module manufacturer provides the first part of the covering cap, so that the gas bag module is provided with a cover which protects the same. After mounting the steering wheel on a steering shaft, e.g. on the part of the original equipment manufacturer (OEM), the second part of the covering cap is mounted.

In a further exemplary aspect of the invention, the gas bag module includes a one-part covering cap facing a driver, which includes a protruding region provided with an opening, which covers the steering wheel hub. An access to the steering wheel hub and the steering wheel fastening region is provided through the opening.

The invention also relates to a gas bag module for a vehicle steering wheel, wherein the gas bag module is formed such that it can be arranged in radial direction outside the steering wheel hub and/or eccentrically to the steering wheel hub of a vehicle steering wheel. For example, it can be provided that the gas bag module is formed ring-shaped or partly ring-shaped and has a central cutout via which the steering wheel hub and the steering wheel fastening region are freely accessible from above.

In an alternative aspect it can be provided that the gas bag module is formed such that it can be mounted in the vehicle steering wheel in the region of one of the spokes and eccentrically, namely laterally of the steering wheel hub. For this purpose, it can include indentations and the like. According to one aspect, the gas bag module is arranged in the vehicle steering wheel eccentrically to the steering wheel hub. It can be provided that the gas bag module comprises a module housing which is attached to an element of the steering wheel skeleton formed eccentrically to the steering wheel hub. This element of the steering wheel skeleton formed eccentrically to the steering wheel hub can be connected with the steering wheel hub.

According to one design variant of the invention, the gas bag is arranged in radial direction exclusively outside the steering wheel hub and eccentrically to the steering wheel hub such that the gas bag is arranged laterally of the steering wheel hub in a space region of maximally about 240°. This means that the gas bag—in direct arrangement or in arrangement in a gas bag module—extends around the steering wheel hub laterally adjacent to the steering wheel hub in a space region up to 240°. The corresponding angle also can be smaller and for example merely amount to 120°, 90°, 60°, 45°, or 30°. Hence, an eccentric arrangement exists to the effect that the gas bag does not extend around the steering wheel hub in a closed manner, but is arranged merely in a particular space region. In particular, it can be provided that the gas bag is arranged laterally of the steering wheel hub in the region of one of the spokes.

In a further aspect of the invention, the invention relates to a method for mounting a vehicle steering wheel in a steering shaft of a vehicle, wherein the vehicle steering wheel includes a steering wheel hub, a steering wheel rim and steering wheel spokes and the steering wheel hub comprises a steering wheel fastening region. The method includes the following steps:

arranging a gas bag in the vehicle steering wheel such that the gas bag is arranged in radial direction outside the steering wheel hub and/or eccentrically to the steering wheel hub, so that the steering wheel fastening region remains accessible, and fastening the vehicle steering wheel with the gas bag mounted in the vehicle steering wheel to the steering shaft by means of an assembly from above.

The gas bag thus is arranged in the vehicle steering wheel such that the steering wheel fastening region nevertheless remains accessible from above. After assembly of the gas bag in the vehicle steering wheel, the vehicle steering wheel is fastened to a steering shaft by means of an assembly from above. As explained already, the gas bag can be part of a prefabricated gas bag module or be incorporated directly into a gas bag receptacle formed in the steering wheel.

According to one exemplary aspect of the method, the gas bag module includes a two-part covering cap, wherein a first part of the covering cap covers the gas bag, and wherein a second part of the covering cap is mounted only after connecting the steering wheel with the steering shaft and then covers the steering wheel hub.

BRIEF DESCRIPTION OF THE DRAWINGS

The invention will be explained in detail below by means of several exemplary embodiments with reference to the Figures of the drawing.

FIG. 4A shows a design variant of a two-part covering cap.

FIG. 4B shows another design variant of the one part of a two-part covering cap.

FIG. 5 shows a first alternative exemplary embodiment of a vehicle steering wheel, wherein a gas bag is arranged in a prefabricated gas bag module and the gas bag module is fastened to the steering wheel by maintaining an access to the steering wheel fastening region.

FIG. 6 shows a second alternative exemplary embodiment of a vehicle steering wheel, which corresponds to the exemplary embodiment of FIG. 5 except for the fact that the gas bag module has a two-part covering cap.

DETAILED DESCRIPTION

Figure 1:
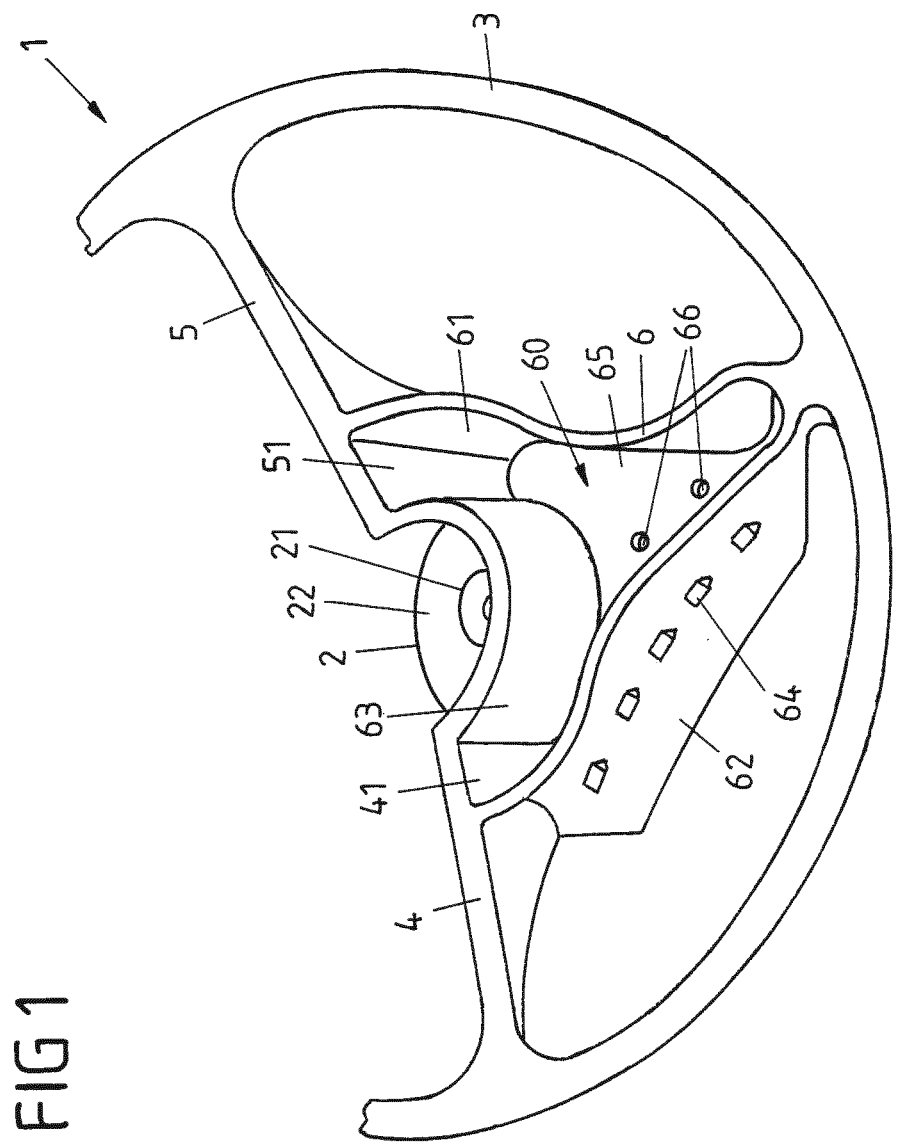
FIG. 1 shows a perspective view of an exemplary embodiment of a vehicle steering wheel, wherein the vehicle steering wheel forms an eccentrically arranged receptacle for a gas bag.

FIG. 1 shows a vehicle steering wheel 1 with a steering wheel skeleton which includes a steering wheel hub 2, a steering wheel rim 3 and several, in the illustrated exemplary embodiment three steering wheel spokes 4, 5, 6, which connect the steering wheel hub 2 with the steering wheel rim 3.

The steering wheel hub 2 comprises a steering wheel fastening region 21, which for example constitutes a central opening in the form of a tubular cylindrical portion and which serves to accommodate a steering shaft stub of a steering shaft (not shown). The steering shaft also is referred to as steering spindle and is coupled with a steering gear. For the axial fixation of the steering wheel hub 2 and hence of the steering wheel 1 at such steering shaft, for example a fastening screw, a fastening nut or some other fastening means is provided. Such hub fixations are known to the skilled person.

It should be noted that in accordance with this invention an attachment of the steering wheel to the steering shaft of a vehicle is considered, in which an access to the steering wheel hub 2 for realizing such attachment is effected from above in axial direction of the steering shaft and from the vehicle interior space towards the same. It is not provided that the attachment of the steering wheel to the steering shaft is effected by laterally inserted clamping elements or the like, as they are known from DE 44 15 765 A1, as this would require a constructively complex and expensive change of the hub connection.

The steering wheel hub 2 furthermore includes a disk-shaped portion 21 which adjoins the central opening 21.

In the region of the middle hub 6 the steering wheel skeleton forms an eccentrically arranged receptacle 60 for a gas bag, whose side walls partly extend into the region of the steering wheel spokes 4 and 5. The receptacle 60 comprises two side walls 61, 62, which approximately form two legs of a triangle which proceeding from the side walls 4, 5 converge in direction of the steering wheel rim 3. The basis of this approximately triangular receptacle 60 is formed by side walls 41, 51 of the steering wheel spokes 4, 5 and by a circularly bent side wall 63 connecting these side wall 41, 51. The side wall 63 is curved in direction of the receptacle 60, so that the hub region 2 in no way is covered by the receptacle 60 and rather is freely accessible.

The bottom of the receptacle 60 is formed by a base plate 65. In said base plate two openings 66 are formed, which serve for fastening a gas generator in the receptacle 60, as will yet be explained. Furthermore, a plurality of fastening means 64 each are formed on the outside of the side walls 61, 62 for fastening a covering cap, as will also yet be explained.

In the exemplary embodiment of FIG. 1, the receptacle 60 is formed integrally with the other elements of the steering wheel skeleton. Steering wheel skeleton and receptacle for example are made of a magnesium-aluminum alloy and are formed as casting. Due to the use of aluminum or an aluminum alloy for realizing the steering wheel skeleton thin-walled walls can be provided, which facilitates the provision of the receptacle 60 in the spoke region.

Figure 2:
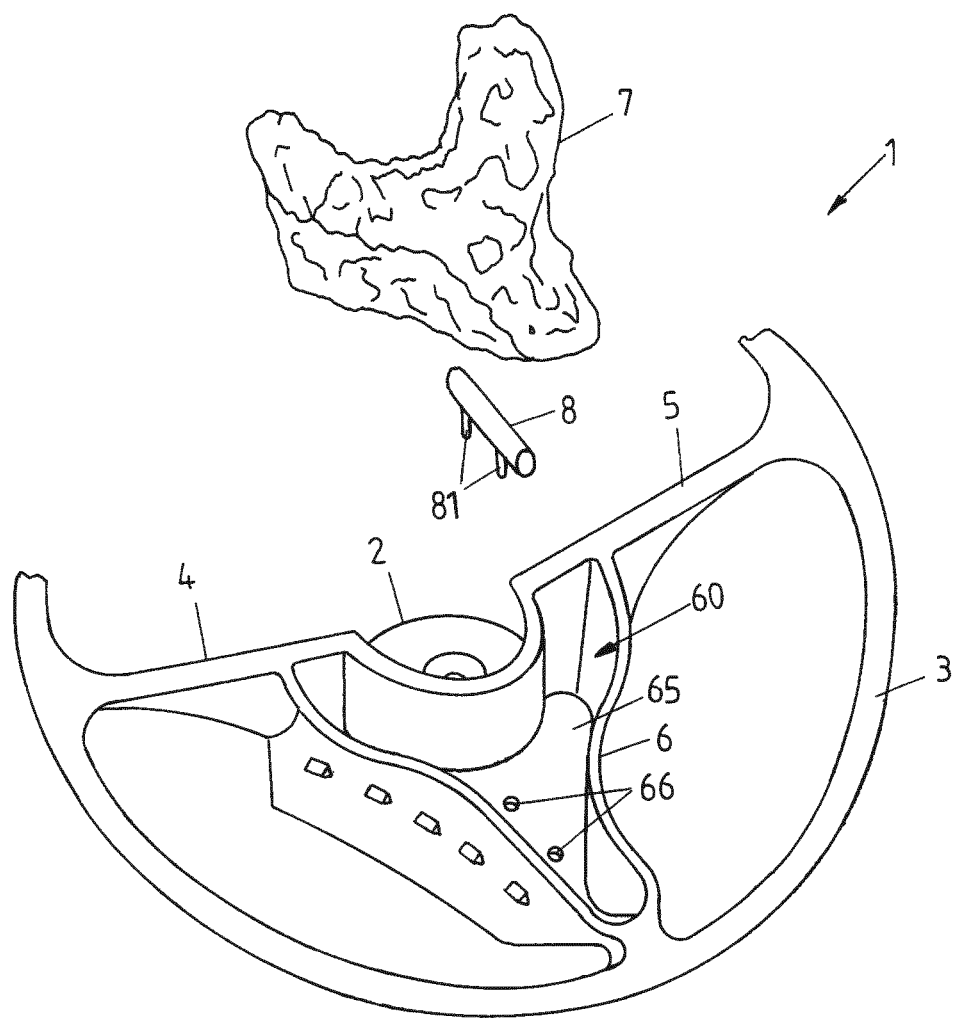
FIG. 2 shows the vehicle steering wheel of FIG. 1 together with a gas bag and a gas generator, which are fastened in or to the receptacle of the vehicle steering wheel.

FIG. 2 shows the steering wheel of FIG. 1, wherein a schematically illustrated gas bag 7 and a gas generator 8 are shown in addition. The gas generator 8 is formed as tubular gas generator and includes two protruding bolts 81. The same are provided to be put through the openings 66 of the base plate 65 of the receptacle 60 for fastening the gas generator 8 to the steering wheel skeleton. The gas generator however can also be fastened to the receptacle 60 in some other way, for example by using clamps.

The gas bag 7 is introduced into the receptacle 60. For this purpose, it can be provided for example that the gas bag 7 is mechanically folded into the receptacle 60. Alternatively, it can be provided that the gas bag 7 is vacuum-packed, wherein the gas bag has been compressed to a gas bag package by means of negative pressure. Said gas bag package is stowed in a protective sleeve formed by a film, which is closed in a gas-tight manner and prevents an expansion of the gas bag package as long as the same is not inflated by means of the gas generator 8 for the protection of a vehicle occupant. Under the influence of the gas bag package deploying during inflation, such film will burst, so that the gas bag package can deploy. When a vacuum pack is used, such gas bag package is placed into the receptacle 60.

FIG. 2 furthermore reveals that in the receptacle 60 laterally adjacent to the steering wheel hub 2 the gas bag 7 extends around the steering wheel hub 2 in a space region of about 180°.

Figure 3:
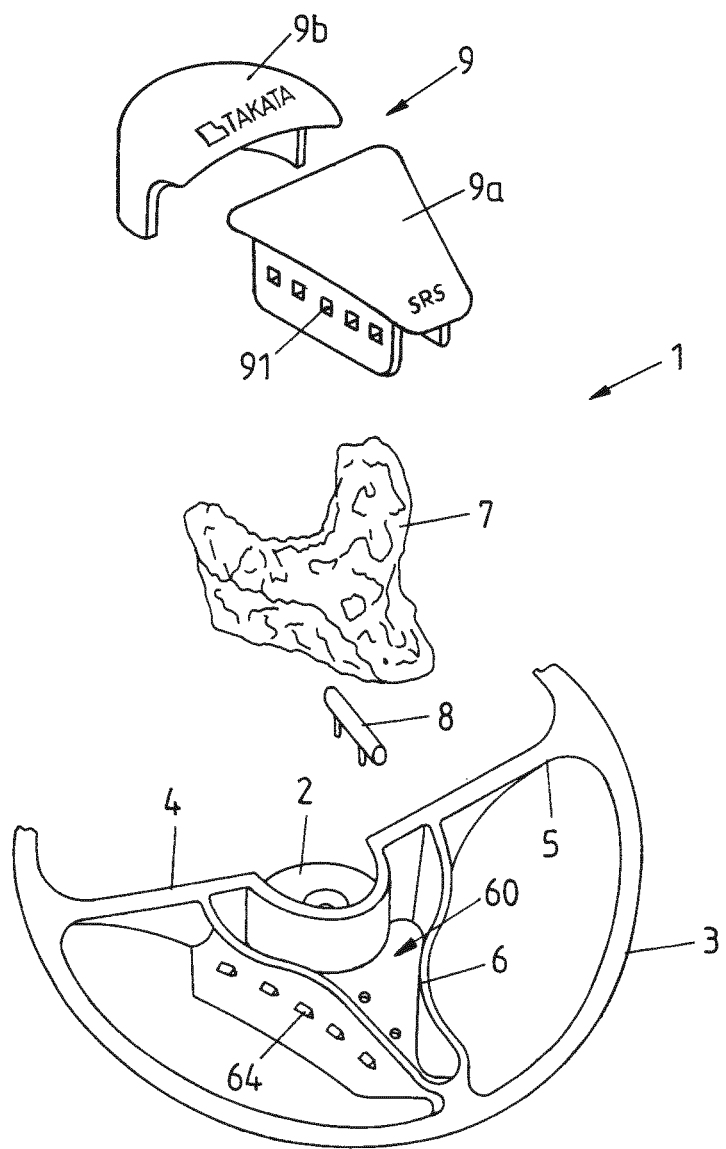
FIG. 3 shows the vehicle steering wheel of FIGS. 1 and 2 with an additional representation of a two-part covering cap.

FIG. 3 shows the arrangement of FIG. 2 with the additional representation of a covering cap 9, which in the completely mounted condition of the steering wheel faces the driver. In the illustrated exemplary embodiment, but not necessarily, the covering cap is formed in two parts and comprises a first part 9a and a second part 9b.

The first part 9a is provided to be arranged on the receptacle 60 and be connected with the same. For this purpose, the covering cap 9a includes schematically illustrated fastening elements 91, for example latching elements, which correspond with the fastening means 64 of the receptacle 60.

The second part 9b is provided to cover the hub region 2 in the completely mounted steering wheel. It can be provided, as is shown in FIG. 4A, that control elements 92 are integrated into the second part 9b, for example control elements for an on-board computer or a car radio. Alternatively or in addition, as is shown in FIG. 4B, display elements 93 furthermore can be integrated into the second part 9b of the covering cap 9.

In one design variant, the second part 9b of the covering cap 9 in addition is provided to realize a horn function in connection with further elements (not shown). For this purpose, the second part 9b is movably, for example pivotally mounted in the steering wheel. A horn function can be activated by a driver with a small actuating force, since for activating the horn function merely the covering cap 9b must be pivoted, but not a much heavier gas bag module, as it is required in the prior art.

The use of a two-part covering cap 9 also has the advantage of small gap dimensions. The gap dimensions provide the necessary sequence of movements between the covering cap and the steering wheel skeleton, in order to be able to close the horn contacts. Without such gap dimensions, a proper horn function cannot be realized reliably, since a minimum of force and path must be observed, in order to be able to realize a horn function. Due to the fact that only the second part 9b is movably mounted, the gap dimensions can be minimized.

In the exemplary embodiment of FIGS. 1 to 3 the steering wheel skeleton 2-6, the receptacle 60 integrated into the same, the gas bag 7, the gas generator 8 and the one part 9a of the covering cap, which closes and optically defines the receptacle 60, represent a gas bag module. The same can include further components, such as for example a foam cladding of the steering wheel skeleton and an envelope for example made of leather or a plastic material. Such gas bag module or steering wheel with integrated gas bag has a high manufacturing depth. On the part e.g. of an original equipment manufacturer (OEM) it then is only necessary to mount the steering wheel on the steering shaft and to attach a small number of remaining components such as for example the second part 9b of the two-part gas bag cap 9.

It should be noted that the configuration of the receptacle 60 in the exemplary embodiment of FIGS. 1 to 3 merely is to be understood by way of example. Numerous other configurations of an integration of a receptacle 60 for a gas bag or a folded gas bag package lie within the scope of the invention. For example, the receptacle can extend around the steering wheel hub 2 in a ring-shaped or partly ring-shaped manner. In this case, too, the steering wheel hub 2 is freely accessible for an assembly from above. It is also conceivable that the receptacle 60 extends more into the region of the other spokes 4, 5, or for example is formed merely in the region of the lateral spokes 4, 5. It is also conceivable that the steering wheel has another number of spokes, for which case the receptacle is arranged and formed in another way. A ring shape of a receptacle also can be combined with an eccentric configuration.

Furthermore, it should be noted that the gas generator 8 shown in FIGS. 2 and 3 is to be understood merely by way of example. Instead of a tubular gas generator, for example a pot-shaped gas generator can also be used and be fastened in the region of the receptacle 60.

In further configurations, the gas generator is cast integrally with the steering wheel skeleton. In the steering wheel skeleton a volume is provided, which can be filled with a cold gas or a pyrotechnical propellant charge. Filling such volume of the steering wheel skeleton with gas or a pyrotechnical propellant charge can be effected before or after fastening the steering wheel to the steering shaft of a vehicle.

Furthermore, it should be noted that in the exemplary embodiment of FIGS. 1 to 3 a one-piece covering cap can be used alternatively. The same is mounted e.g. on the part of an original equipment manufacturer after fastening the steering wheel to the steering shaft.

As explained, the steering wheel skeleton with the steering wheel hub 2, the steering wheel rim 3, the steering wheel hubs 4, 5, 6 and the integrated receptacle 60 is formed as an integral part in the exemplary embodiment of FIGS. 1-3. In alternative exemplary embodiments it can be provided that at least one of said elements of the steering wheel skeleton is manufactured separately and then is connected with the other elements of the steering wheel skeleton. It can also be provided that at least two elements of the steering wheel skeleton are made of different materials.

The exemplary embodiment of FIGS. 1 to 3 relates to a design variant of the invention in which a gas bag and a gas generator are integrated directly into a steering wheel. However, it also lies within the scope of the invention that the gas bag and the gas generator initially are arranged in a gas bag module which is manufactured on the part of an automotive supplier. This gas bag module then is fastened in the steering wheel e.g. on the part of an original equipment manufacturer during the assembly of the steering wheel. The present invention also can be realized in such a steering wheel construction with separate gas bag module, as will be explained below by way of example with reference to FIGS. 5 and 6, in which two exemplary embodiments are shown.

FIG. 5 shows a steering wheel with a steering wheel skeleton which includes a steering wheel hub 2, a steering wheel rim 3 and three steering wheel spokes 4, 5, 6. Like in the exemplary embodiment of FIG. 1, the steering wheel hub 2 comprises a steering wheel fastening region in the form of an opening 21 and an adjoining disk-shaped portion 22.

In the illustrated exemplary embodiment, the disk-shaped portion 22 has an eccentric expansion 25 in direction of the central spoke 6, wherein the eccentric expansion 25 is not part of the actual steering wheel hub, but forms a further element of the steering wheel skeleton. As steering wheel hub in the sense of the present invention only a circular or radially symmetrical hub region is regarded, which forms the steering wheel fastening region 21.

The eccentric expansion 25 comprises a central opening 252 and two mounting openings 251 formed symmetrical thereto. The eccentric expansion 25 serves the accommodation and fixation of a gas bag module 10. At its radially outer end the expansion 25 merges into the third steering wheel spoke 6.

The gas bag module 10 has a conventional construction. It comprises a folded gas bag package, which can be vacuum-packed, a gas generator and a module housing 13. It can include further components such as a gas generator support. The module housing 13 is closed by a one-piece covering cap 90. In its size the covering cap 90 does not correspond to the module housing 13, but extends beyond the module housing 13 in a protruding region 95. In the center of this protruding region 95 an opening 11 is formed, which can be closed by a separate closure element 12 which for example can be provided with an emblem.

The gas bag module 10 is manufactured by an automotive supplier as a prefabricated module. The assembly at the steering wheel 1 is effected e.g. with the original equipment manufacturer (OEM). For this purpose, the gas bag module 10 is attached to the steering wheel skeleton at the eccentric expansion 25, wherein a region 14 of the gas bag module protrudes into the opening 252 and the gas bag module 10 is attached to the expansion 25 by means of two screws or bolts 13 and the mounting openings 252. The orientation of the gas bag module 10 at the steering wheel 1 is such that the opening 11 is positioned in the protruding region 95 of the gas bag cap 90 above the opening 22 of the steering wheel hub 2. This allows to achieve an accessibility of the hub attachment also after mounting the gas generator 10 on the steering wheel 1. Thus, fastening means such as screws and fastening tools such as screwdrivers and the like can be guided through the opening 11 for an assembly from above.

After fastening the steering who 1 to a steering shaft, the opening 11 of the covering cap 90 can be closed by the closure element 12. The assembly of the steering wheel is completed.

It should be noted that in the exemplary embodiment of FIG. 5 the gas bag also is arranged eccentrically to the steering wheel hub 2. This is achieved in that the gas bag module 10 with the folded gas bag is fastened to the steering wheel in the portion 25 eccentrically to the steering wheel hub 2. The protruding region 95 merely is provided to realize a cover towards the driver also in the region above the steering wheel hub 2. However, this protruding region 95 no longer serves for closing and covering the module housing and the folded gas bag located in the same.

FIG. 6 shows a further exemplary embodiment of the invention which corresponds to the exemplary embodiment of FIG. 5 except for the fact that the covering cap 9 of the gas bag module 10 is formed in two parts and includes a first part 9a, which is part of the gas bag module 10 and covers the module housing with the folded gas bag, and a second part 9b which is fastened only after mounting the gas bag module on the vehicle steering wheel and after mounting the vehicle steering wheel on the steering shaft. The assembly of the second part 9b of the covering cap is effected e.g. with the original equipment manufacturer. The gas bag module 10 including the first part 9a of the covering cap, on the other hand, can be manufactured completely by an automotive supplier.

The advantages of a two-part covering cap 9 as explained with respect to FIGS. 3, 4A and 4B also apply here. In particular, control elements and/or display elements can be integrated into the second part 9b of the covering cap like in FIGS. 4A and 4B. It can thereby be refrained from realizing such control elements and/or display elements at the steering wheel rim, whereby the construction of the steering wheel rim is simplified. Furthermore, a smaller horn activation force and small gap dimensions can be realized by means of the second part 9b of the covering cap.

FIGS. 5 and 6 furthermore reveal that in the gas bag module 10 laterally adjacent to the steering wheel hub 2 the gas bag extends around the steering wheel hub 2 in a space region of about 30°.

The invention is not limited in its configuration to the exemplary embodiments described above, which should merely be understood by way of example. For example, the size, shape and configuration of the steering wheel hub, the steering wheel spokes and a possibly present receptacle for a gas bag can differ from the described exemplary embodiments.

The invention claimed is:

1. A vehicle steering wheel with a steering wheel skeleton comprising a steering wheel hub, a steering wheel rim and steering wheel spokes which connect the steering wheel rim with the steering wheel hub, wherein the steering wheel hub includes a steering wheel fastening region for fastening the vehicle steering wheel to a steering shaft of a vehicle, wherein in the vehicle steering wheel a gas bag is mounted, wherein the gas bag is arranged in the vehicle steering wheel in radial direction exclusively outside the steering wheel hub and/or eccentrically to the steering wheel hub, wherein the steering wheel skeleton forms a receptacle for the gas bag, in which the gas bag is arranged, and wherein the receptacle is formed eccentrically to the steering wheel hub.

2. The vehicle steering wheel according to claim 1, wherein the receptacle is formed integrally with other elements of the steering wheel skeleton.

3. The vehicle steering wheel according to claim 1, wherein the steering wheel skeleton includes a spoke region and the receptacle is formed in the spoke region.

4. The vehicle steering wheel according to claim 1, wherein the gas bag forms a vacuum-packed gas bag package.

5. The vehicle steering wheel according to claim 1, wherein a gas generator is attached directly to the steering wheel skeleton or is integrated into the same.

6. The vehicle steering wheel according to claim 1, wherein the gas bag is arranged in radial direction exclusively outside the steering wheel hub and eccentrically to the steering wheel hub such that the gas bag is arranged laterally of the steering wheel hub in a space region of maximally about 240°.

7. A gas bag module for a vehicle steering wheel according to claim 1, wherein the gas bag module is formed such that it can be arranged in radial direction outside the steering wheel hub and/or eccentrically to the steering wheel hub of a vehicle steering wheel.

8. A vehicle steering wheel with a steering wheel skeleton comprising a steering wheel hub, a steering wheel rim and steering wheel spokes which connect the steering wheel rim with the steering wheel hub, wherein the steering wheel hub includes a steering wheel fastening region for fastening the vehicle steering wheel to a steering shaft of a vehicle, wherein in the vehicle steering wheel a gas bag is mounted, wherein the gas bag is arranged in the vehicle steering wheel in radial direction exclusively outside the steering wheel hub and/or eccentrically to the steering wheel hub, and wherein the steering wheel includes a two-part covering cap facing a driver, wherein a first part of the covering cap covers the gas bag and a second part of the covering cap covers the steering wheel hub.

9. The vehicle steering wheel according to claim 8, wherein the second part of the covering cap includes at least one control element and/or at least one display element.

10. The vehicle steering wheel according to claim 8, wherein the second part of the covering cap is movably mounted and coupled with elements which realize a horn function.

11. A vehicle steering wheel with a steering wheel skeleton comprising a steering wheel hub, a steering wheel rim and steering wheel spokes which connect the steering wheel rim with the steering wheel hub, wherein the steering wheel hub includes a steering wheel fastening region for fastening the vehicle steering wheel to a steering shaft of a vehicle, wherein in the vehicle steering wheel a gas bag is mounted, wherein the gas bag is arranged in the vehicle steering wheel in radial direction exclusively outside the steering wheel hub and/or eccentrically to the steering wheel hub, wherein the gas bag is part of a prefabricated gas bag module including a gas generator, which has been mounted in the vehicle steering wheel before mounting the same to a steering shaft, wherein the steering wheel includes a two-part covering cap facing a driver, and wherein a first part of the covering cap covers the gas bag and a second part of the covering cap covers the steering wheel hub and the first part of the covering cap is part of the gas bag module, while the second part of the covering cap has been attached to a steering shaft in the vehicle steering wheel after assembly of the steering wheel.

12. A vehicle steering wheel with a steering wheel skeleton comprising a steering wheel hub, a steering wheel rim and steering wheel spokes which connect the steering wheel rim with the steering wheel hub, wherein the steering wheel hub includes a steering wheel fastening region for fastening the vehicle steering wheel to a steering shaft of a vehicle, wherein in the vehicle steering wheel a gas bag is mounted, wherein the gas bag is arranged in the vehicle steering wheel in radial direction exclusively outside the steering wheel hub and/or eccentrically to the steering wheel hub, wherein the gas bag is part of a prefabricated gas bag module including a gas generator, which has been mounted in the vehicle steering wheel before mounting the same to a steering shaft, and wherein the gas bag module includes a one-part covering cap facing a driver, which includes a protruding region provided with an opening, which covers the steering wheel hub.

* * * * *